(12) United States Patent
Job

(10) Patent No.: US 7,163,067 B2
(45) Date of Patent: Jan. 16, 2007

(54) GROUND MAINTENANCE APPARATUS

(76) Inventor: Wayne Sinclair Job, PO Box 470. Kilmore, Kilmore 3764 (AU)

( * ) Notice: Subject to any disclaimer, the term of this patent is extended or adjusted under 35 U.S.C. 154(b) by 48 days.

(21) Appl. No.: 10/793,057

(22) Filed: Mar. 4, 2004

(65) Prior Publication Data
US 2005/0194156 A1 Sep. 8, 2005

(51) Int. Cl.
*A01B 45/02* (2006.01)
(52) U.S. Cl. .......................................... 172/21; 172/540
(58) Field of Classification Search ................. 172/21, 172/22, 32, 51, 78, 108, 109, 540
See application file for complete search history.

(56) References Cited

U.S. PATENT DOCUMENTS

| | | | | |
|---|---|---|---|---|
| 4,662,456 A | * | 5/1987 | Classen | 172/22 |
| 5,816,336 A | * | 10/1998 | Underhill | 172/22 |
| 6,142,239 A | * | 11/2000 | Underhill | 172/22 |
| 6,142,240 A | * | 11/2000 | Underhill | 172/22 |
| 6,321,849 B1 | * | 11/2001 | Underhill | 172/22 |
| 6,488,100 B1 | * | 12/2002 | Underhill | 172/22 |
| 6,651,753 B1 | * | 11/2003 | Gauthier | 172/111 |
| 2005/0173133 A1 | * | 8/2005 | Maas et al. | 172/22 |

FOREIGN PATENT DOCUMENTS

GB 2268385 A * 1/1994

* cited by examiner

*Primary Examiner*—Victor Batson
(74) *Attorney, Agent, or Firm*—Ian F. Burns & Associates; Ian F. Burns

(57) ABSTRACT

A ground maintenance apparatus which may be used for slicing, scarifying, dethatching and mowing of grass or turf is disclosed. The apparatus may also be used for sweeping and vacuuming of turf, and is particularly directed at ground or turf aeration apparatus.

10 Claims, 10 Drawing Sheets

GROUND MAINTENANCE APPARATUS

BACKGROUND OF THE INVENTION

1. Field of the Invention

This invention relates to ground maintenance apparatus which may be used for slicing, scarifying, dethatching and mowing of grass or turf. The ground maintenance apparatus of the invention may also be used for sweeping and vacuuming of turf. The invention is particularly directed at ground or turf aeration apparatus.

2. Background

Hitherto conventional ground maintenance or ground aeration apparatus is described in WO 99/09802 which relates to a movable vehicle having a slicing mechanism which comprises spaced cutters mounted to a rotatable support axle for slicing the ground. The support axle was attached to a sub frame which could be raised or lowered relative to a main frame for the purpose of assuming a non operational or operational position. In this arrangement V shaped slices may be imparted to the ground and this operation is advantageous in that it means that the ground is aerated facilitating the ingress of surface moisture to the root systems of grass or turf. Also the slicing operation enables ground aeration to be carried out efficiently where the least amount of damage is imparted to the grass or turf.

The ground aeration apparatus as described above can also be used for scarifying which involves removal of a top section of grass in rows 25–46 mm apart and at a depth of 3–5 mm. This is a necessary requirement for golf greens as it results in dethatching of golfing greens which involves removal of a matted surface layer of the green which is substantially imperious to flow of liquid therethrough and thus inhibition of moisture or fertiliser reaching the root system results.

In one conventional arrangement there was provided a turf aeration machine which was attached to a tractor having a scarifier rotor having counter rotating reels or blades fitted to a rotatable shaft which was driven by the power take off shaft of the tractor. A range of other rotors could be used in place of the scarifier rotor and these included a dethatcher rotor, flail rotor or broom rotor. If it was desired to vacuum scarified material instead of leaving it on the ground a vacuum pump was fitted to an output duct from the turf aeration machine which then sucked or removed scarified material from the scarifier rotor into a hopper which was attached to the turf aeration machine. There was also provided adjustable front and rear rollers with a flexible top linkage to the tractor that allowed precision height control and operation over contours and modulations. This turf aeration machine may be inspected at www.turfmach.com.

However a first disadvantage of this conventional arrangement was that it could not be used in wet or waterlogged conditions and thus this fact limited its use to dry conditions.

A second disadvantage of the conventional arrangement described above was that the turf aeration machine was connected to the tractor by a three point linkage wherein there were provided a pair of hydraulic arms of the tractor pivotally attached to a transverse bar of the turf aeration machine and there was also provided a fixed upper link between the tractor and the turf aeration machine. This meant that when a hopper was attached to the turf aeration machine upon turning of the tractor this resulted in skidding or lurching of the hopper. This meant that the combined assembly of trailer, turf aeration machine and hopper would only follow a straight line during operation. This factor severely curtailed manoeuvrability of the combined assembly of tractor, turf aeration machine and hopper.

SUMMARY OF THE INVENTION

Advantages of One or More Embodiments of the Present Invention

A first object of the invention is to provide a ground maintenance machine and in particular a turf aeration apparatus that may alleviate the first disadvantage of the prior art.

A second object of the invention is to provide a hitch assembly that may alleviate the second disadvantage of the prior art.

Brief Description of the Present Invention

The invention in a first aspect therefore provides a hitch assembly for use between a primer mover and a trailed vehicle wherein said hitch assembly comprises:

(i) a transverse member attachable by pivot attachment means to each movable arm of the prime mover at spaced locations on the transverse member in use whereby each of said movable arms is pivotable about a horizontal axis defined by the transverse member; and (ii) pivot connection means connectable between the transverse member and a frame member of draw bar of the trailed vehicle whereby in use the frame member or draw bar of the trailed vehicle is pivotable with respect to the transverse member about a vertical axis.

Preferably the transverse member is a rod, bar or tube and may be provided with a plurality of spaced attachment apertures or elongate slot for location of the pivot connection means which then may be fastened in position by a suitable fastener.

The movable arms of the prime mover are preferably spaced hydraulic arms of a tractor which comprise part of the conventional three point linkage discussed above. Each hydraulic arm may be attached to an associated end of the transverse member by suitable pivot attachment means such as each end of the transverse member having associated therewith a pivot pin which is enclosed by a bush or bearing which is attached to an adjacent hydraulic arm.

The pivot connection means of the hitch assembly may be a ball joint or bearing which surrounds a pivot pin or fastener between the transverse member and the frame member or draw bar of the ground maintenance machine.

The hitch assembly as described above is especially advantageous in a situation involving a prime mover such as a tractor, an intermediate vehicle which may include a turf aeration machine and a hopper or trailer connected to the intermediate vehicle. The provision of the hitch assembly enables the hopper or trailer to be turned simultaneously with a turning movement of the tractor. This enables turf aeration operations to be carried out far more efficiently than use of the conventional three point linkage.

Another advantage of use of a hitch assembly as described above is that an intermediate vehicle which may include a sweeper, mower, snow clearing machine or other ground maintenance machine having one or more operating members in contact or adjacent the ground, may be transported by the tractor or prime mover clear of the ground and supported by the wheels of the hopper or trailer as shown hereinafter in the preferred embodiment of the invention shown in the drawings.

It will also be appreciated that the hitch assembly of the invention may be used in a two vehicle situation where a prime mover such as a tractor may transport a trailed vehicle such as a mower or ground roller wherein the trailed vehicle may be transported on its rear wheels when it has two pairs of ground engaging wheels.

A further advantage of use of the hitch assembly as described above in relation to use of a ground maintenance machine means that the operating members of the ground maintenance machine such as slicing blades, mowing blades, brooms or scrapers are always allowed to fully float i.e. follow ground contours or undulations.

The invention therefore in a second aspect refers to a combination of a prime mover such as a tractor and a trailed vehicle such as a ground maintenance machine interconnected by the hitch assembly of the invention.

In a third aspect of the invention there is provided a combination of a prime mover such as a tractor, intermediate vehicle and a trailed vehicle wherein the tractor and the intermediate vehicle are interconnected by the hitch assembly of the invention.

The invention in a fourth aspect refers to a ground maintenance machine having a ground rotor having one or more operating members which may include reels, brooms, blades, scrapers, scarifiers or cutters wherein there is provided a lift rotor located above the ground rotor for elevation of debris removed from the ground whereby the ground rotor and lift rotor are enclosed in a housing having a rear exit for transport of said debris in use onto the ground or into a trailed vehicle attached to the ground maintenance machine.

Preferably the ground rotor may be a scarifier rotor and in this embodiment there also may be provided a broom rotor located behind the scarifier rotor and the lift rotor is located above the scarifier rotor and the broom rotor.

However the ground rotor may also comprise a broom rotor in combination with the lift rotor.

Preferably at least two of the rotors are timed to rotate simultaneously with their operating members including paddles, brooms or blades arranged to rotate in unison with only a relatively small distance between the operating members. This provides a vacuum in the housing and facilitates rapid elevation and movement of debris through the rear exit. This may be accomplished in one embodiment by a timing or transmission belt interconnecting gears, pulleys or sprockets of rotable axles supporting the operating members.

Also within the housing there may be provided one or more internal deflectors to also facilitate removal of debris from the housing.

BRIEF DESCRIPTION OF THE DRAWINGS

Reference may now be made to a preferred embodiment of the invention as shown in the attached drawings wherein.

DETAILED DESCRIPTION OF THE PRESENT INVENTION

Figure 1:
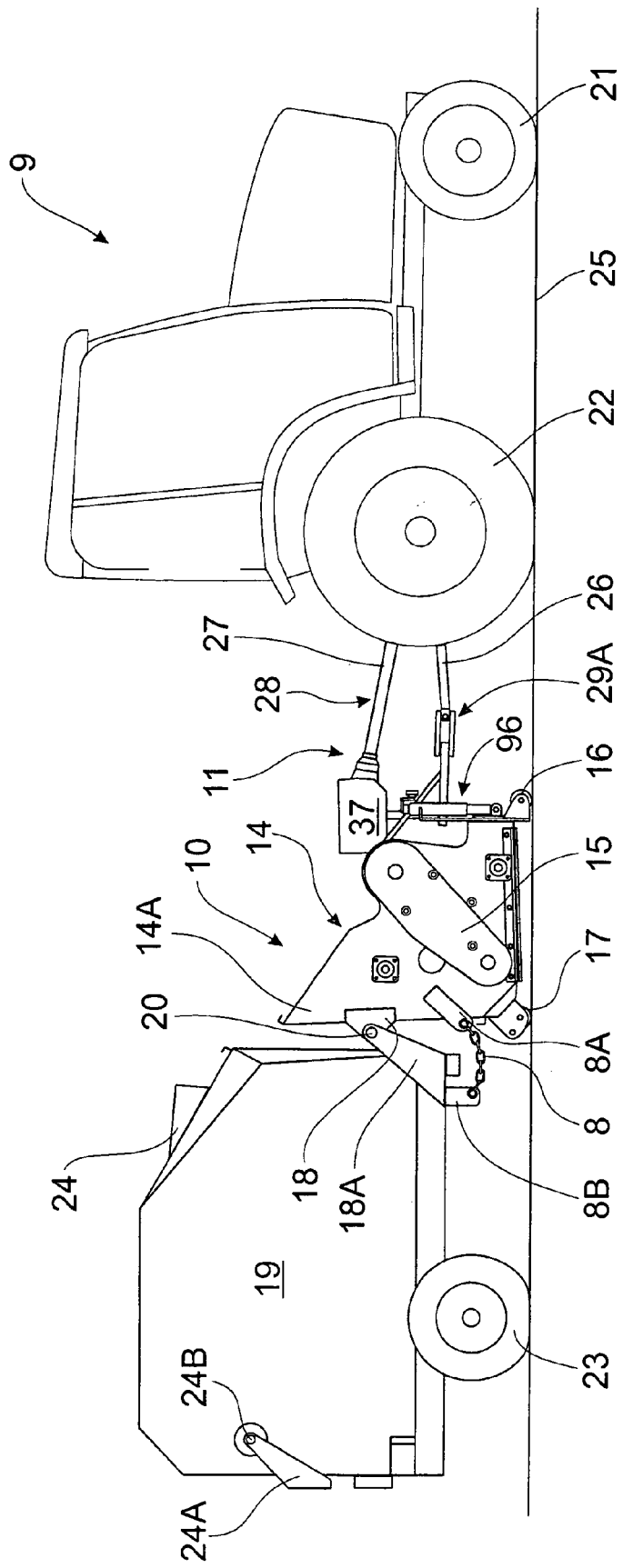
FIG. 1 is a side view of a combined assembly of a tractor, turf aerator and hopper wherein the turf aerator is connected to the tractor by the hitch assembly of the invention and the hopper is connected to the turf aerator and the turf aerator is shown in operational position in contact with the ground.
Figure 2:
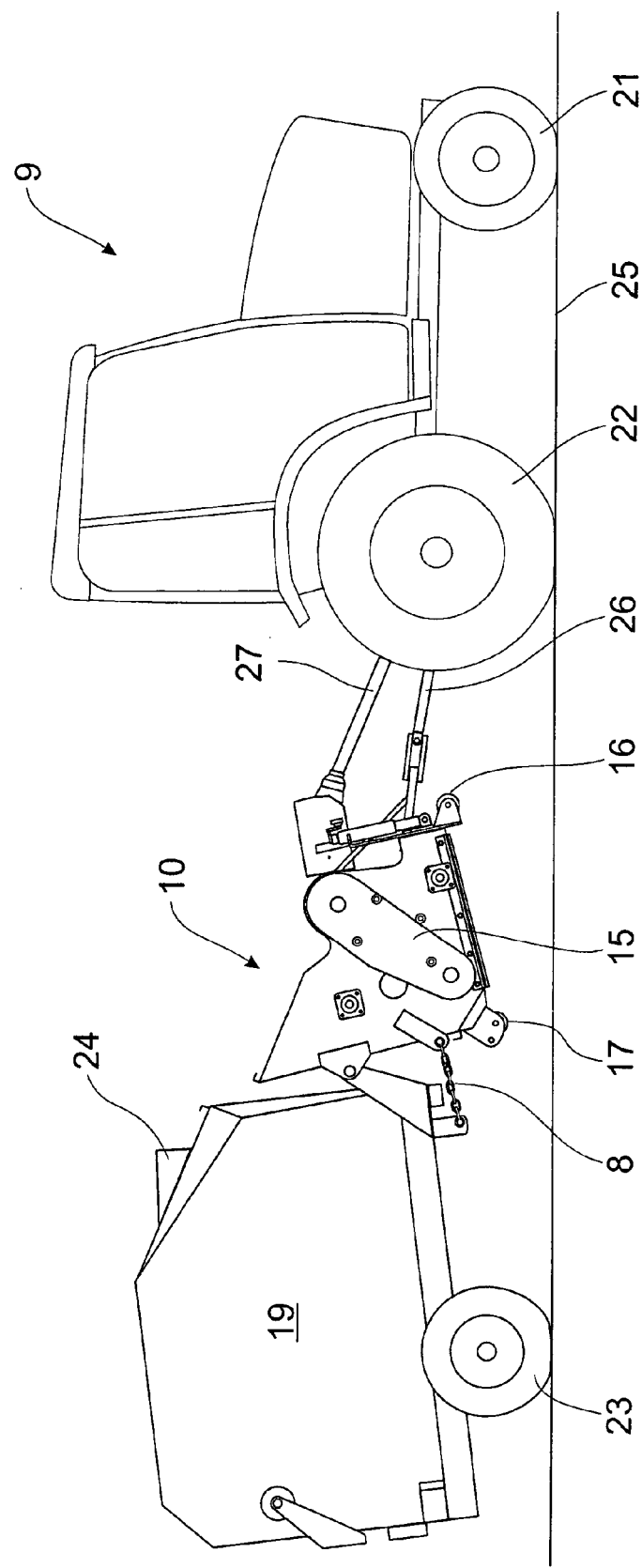
FIG. 2 is a similar view to FIG. 1 wherein the turf aerator is shown elevated above the ground for transport purposes.

In FIGS. 1–2 there is shown tractor 9 attached to turf aerator 10 through an upper drive connection assembly 28 and lower hitch connection assembly 29A which are both described in greater detail in FIGS. 3 and 8–10. The turf aerator 10 comprises a housing 14 having opposed sides 14A shown in FIGS. 1–2 and 14B shown in FIG. 5. Turf aerator 10 also has a drive casing 15 and support rollers 16 and 17. There is provided a chain 8 for connecting turf aerator 10 with a hopper 19 which chain 8 is attached to lugs 8A and 8B respectively. There is also provided brackets 18 and 18A interconnected by pivot joint 20 whereby hopper 19 may be pivoted with respect to turf aerator 10. Tractor 9 is supported by ground engaging wheels 21 and 22 and hopper 19 is supported by ground engaging wheels 23. Hopper 19 is provided with an entrance 24 for receiving harvested material or turf debris from turf aerator 10. There is also provided a latch assembly 24A on hopper 19 for releasing a door 19A shown in FIG. 11 to allow for discharge of material 150 shown in FIG. 11 from hopper 19 into a trailer (not shown) or onto the ground 25 as may be required. Latch assembly 24A is pivoted to hopper 19 at 24B.

FIG. 1 shows the turf aerator 10 in operational position with rollers 16 and 17 in contact with ground 25. FIG. 2 shows the turf aerator 10 in a transport position with rollers 16 and 17 clear of ground 25. This may be achieved by upward pivotal movement of tractor hydraulic arms 26 and upward pivotal movement of power take off shaft 27 of tractor 9 as described hereinafter.

Figure 2A:
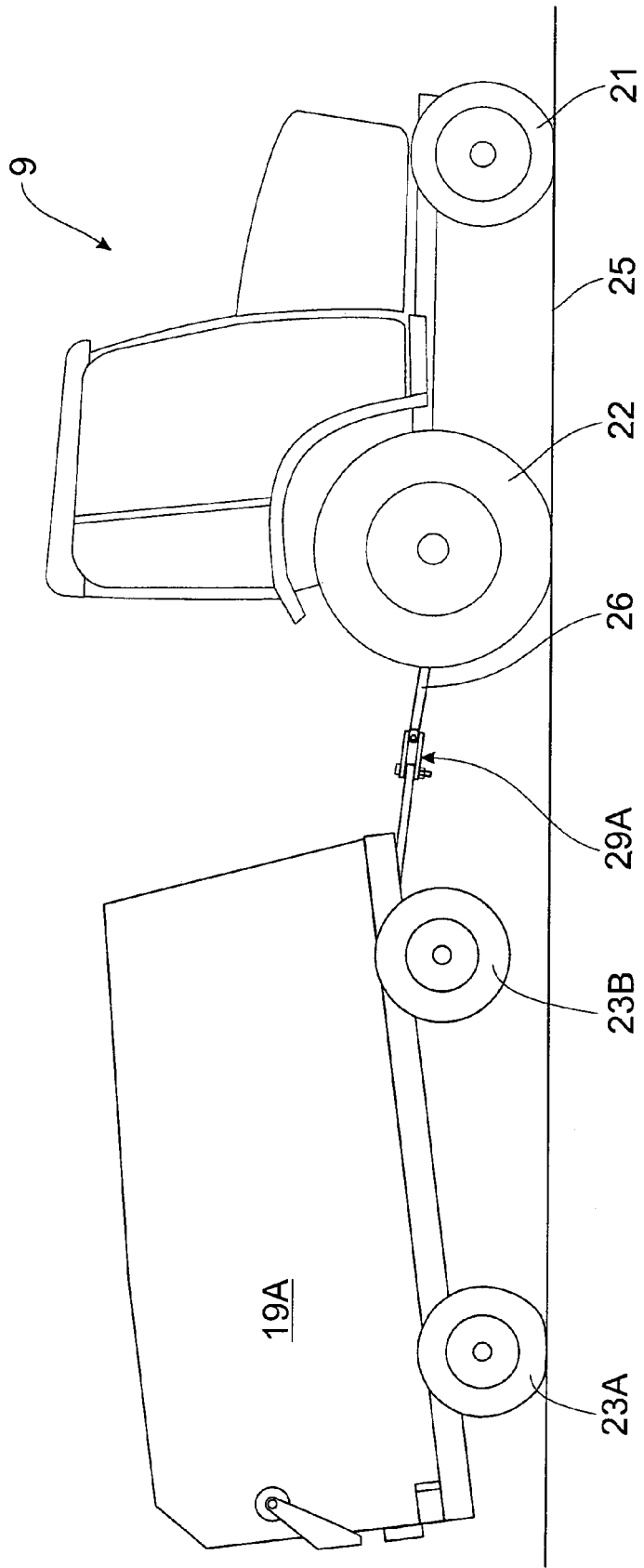
FIG. 2A is a similar view to FIG. 2 showing a two vehicle arrangement of the invention interconnected by the hitch assembly of the invention wherein the trailer vehicle is supported only by a pair of rear ground engaging wheels.

FIG. 2A illustrates the two vehicle arrangement of the invention wherein the turf aerator 10 may be dispensed with and hitch assembly 29A is connected directly to a draw bar 29C of a trailed vehicle 19A as shown. In this arrangement vehicle 19A is supported only by rear ground engaging wheels 23A and a front pair of castor wheels 23B are elevated off the ground 25.

Figure 3:
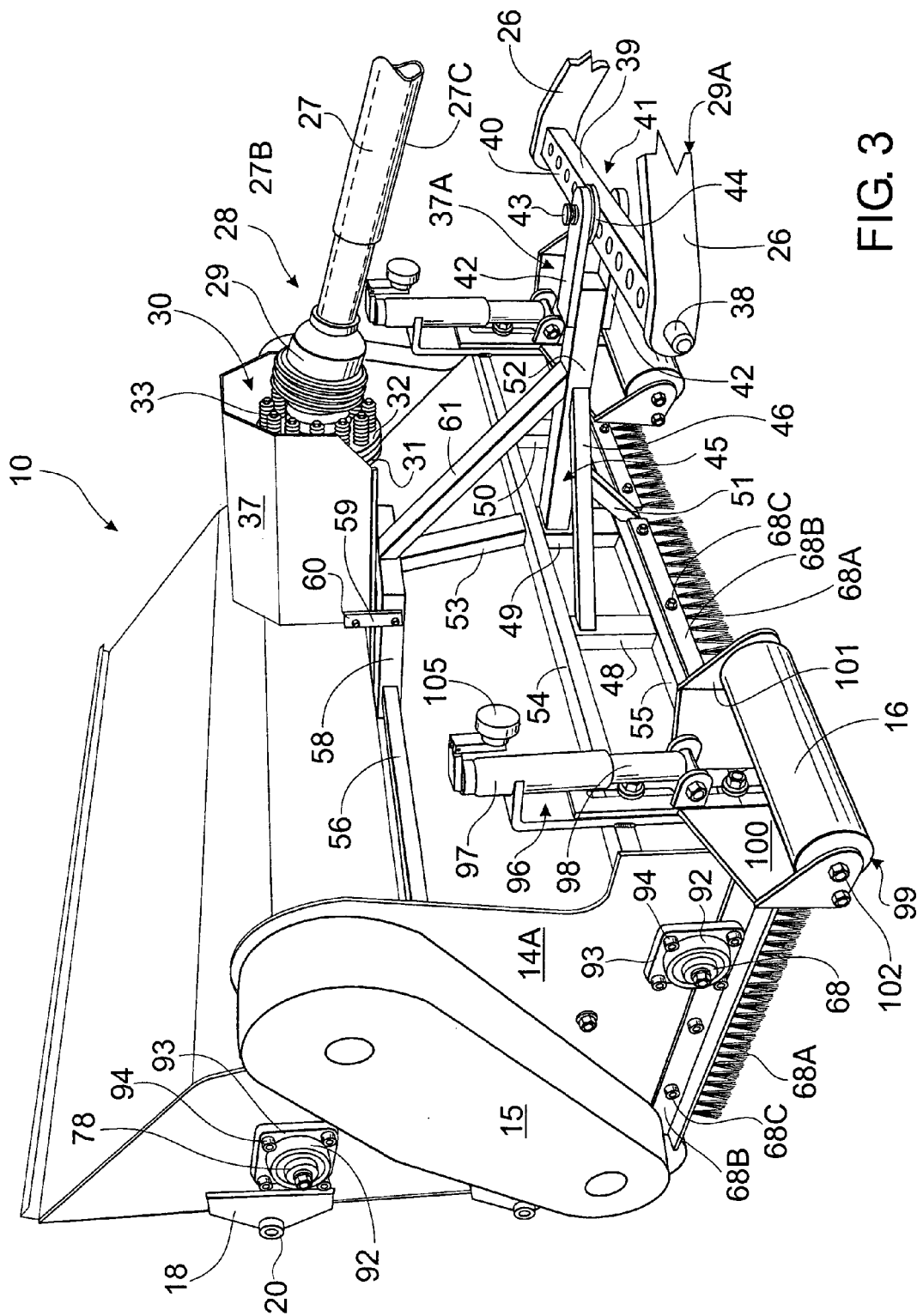
FIG. 3 is a front perspective view of the turf aerator of the invention.

In FIG. 3 there is shown a detailed view of the upper drive connection assembly 28 between power take off shaft 27 and turf aerator 10. In this arrangement drive connection assembly 28 includes a safety cover 29 of the concertina type which encloses power take off shaft 27 shown in phantom which is housed by rubber tubes 27B and 27C. There is also provided a clutch 30 which includes adjusting springs 33. The springs 33 are retained in position on pins 33A shown in FIG. 8 by appropriate retainers (not shown). The clutch 30 is provided with end plates 31 and 32.

There is also provided the lower hitch connection assembly 29A between tractor 9 and turf aerator 10 wherein there is provided a pair of hydraulic arms 26 pivotally attached by pivot joints 38 to transverse arm 39 having a plurality of attachment apertures 40. In a selected aperture 40 there is attached a hitch joint 41 comprising opposed arms 42 of connection means 37A between turf aerator 10 and transverse arm 39. The connection means 37A also comprises longitudinal frame member or draw bar 52 of turf aerator 10. Each arm 42 has aligned apertures (not shown) through which extends fastener 43. There is also provided washers 44.

The turf aerator 10 is provided with an end frame 45 having oblique frame members 46, uprights 48, 49 and 50, braces 51, longitudinal frame member 52, oblique frame member 53 and cross members 54 and 55. There is also provided upper frame member 56 which support a mounting plate 58 for clutch 30 and housing 37. Housing 37 is attached to mounting plate 58 by securing straps 59 and fasteners 60. Mounting plate 58 is also attached to oblique frame member 61.

It will be appreciated that transverse arm 39 and hence tractor 9 may be pivoted about a vertical axis defined by fastener 43. It will also be appreciated that each of arms 26 may pivot about a horizontal axis defined by transverse arm 39.

There is also shown brushes 68A attached to the sides 14A and 14B and frame 45 of turf aerator 10 which facilitate creation of a partial seal within the interior of turf aerator 10 to produce a vacuum as described below in relation to FIG. 4. Such brushes 68A are suspended from elongate supports 68B by fasteners 68C.

Figure 4:
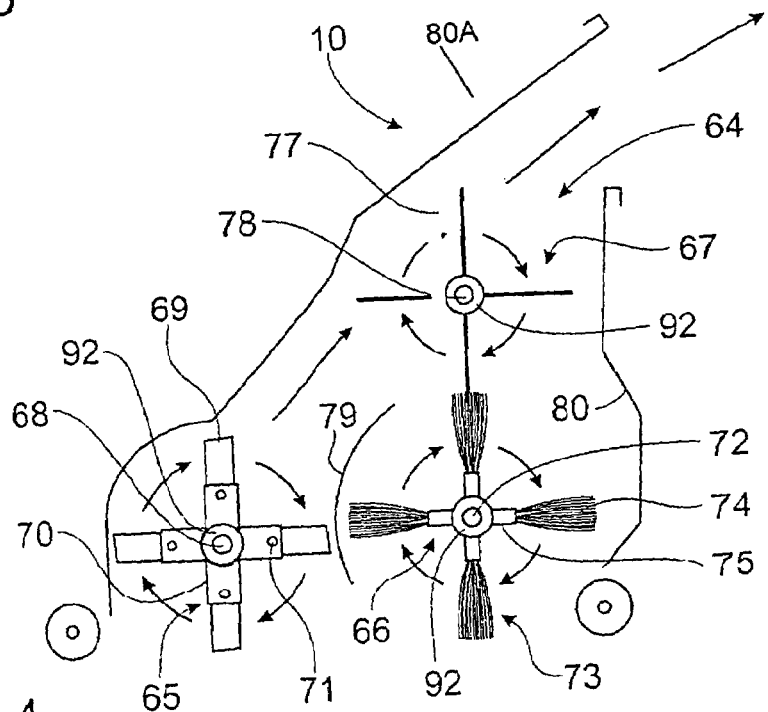
FIG. 4 is a schematic side view showing operation of the turf aerator of the invention.

In FIG. 4 there is shown a schematic side view of an internal mechanism 64 of turf aerator 10 which comprises scarifier rotor 65, broom rotor 66 and lift rotor 67. Scarifier rotor 65 comprises shaft 68 having scarifying blades 69 attached thereto by brackets 70 and fasteners 71. The broom rotor 66 comprises broom shaft 72 having a plurality of brooms 73 attached thereto. Each broom 73 comprises a bristle component 74 and support base 75. The lift rotor 67 has lifting blades 77 attached to shaft 78. There is also shown a rear deflector 80A.

In operation of the internal mechanism 64 as ground material or debris is scarified by blades 69 penetrating the ground 25 such material is lifted or elevated above scarifier rotor 65 and this is facilitated by the provision of deflector 79. Each of the broom rotor 66 and lift rotor 67 are timed for simultaneous rotation so that blades 77 are aligned with brooms 73 in a similar orientation as shown in FIG. 4. This action provides for elevation of scarified material above scarifier rotor 65 as shown by the arrows in full outline so that no scarified material is deposited on ground 25. If any scarified material falls below lift rotor 67 and rearwardly of broom rotor 66 then deflector 80 pushes said scarified material into the area of rotation of brooms 73 so that such material is propelled upwardly as it deflects of the rear surface of deflector 79.

It also will be appreciated that the method of operation of internal mechanism provides generation of a large volume of air so that sweeping and vacuuming of scarified material can be carried out simultaneously.

It will be appreciated that both deflectors 79 and 80 are adjustable vertically for depth control of scarifier rotor 65 and broom rotor 66.

It will also be appreciated that scarifier rotor 65 may be replaced if desired by a differently configured rotors for different tasks such as for example the provision of a flail mowing rotor or alternatively may be omitted.

It will further be appreciated that if desired there may be provided a further lift rotor or plurality of lift rotors above lift rotor 67 for discharge of scarified materials at higher levels than the level shown in FIG. 4.

Figure 5:
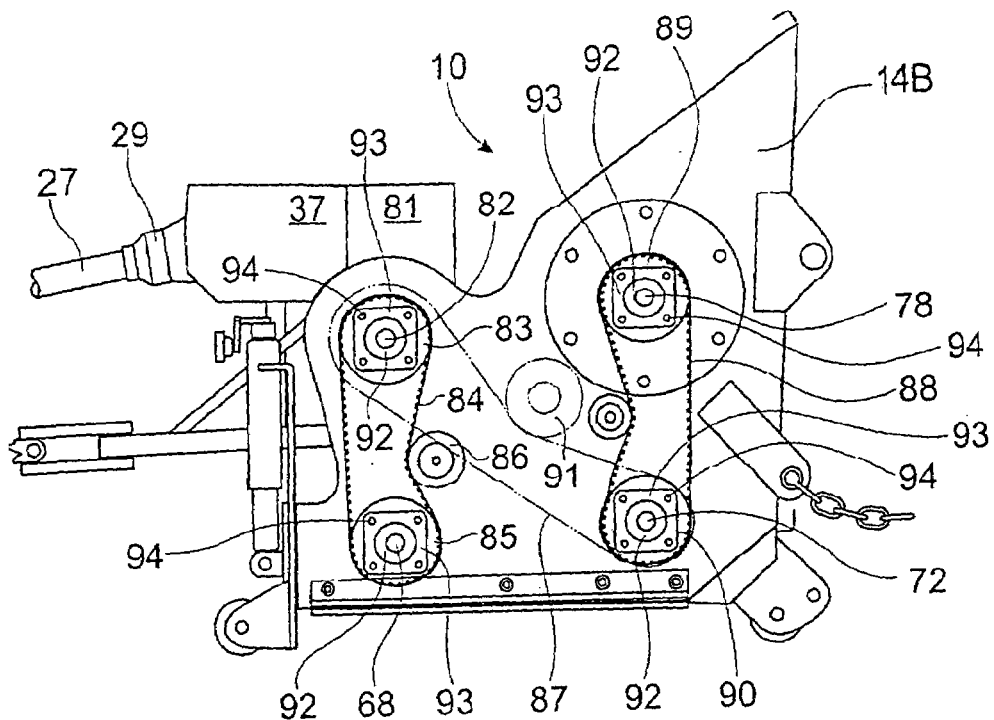
FIG. 5 is a side view of the turf aerator of the invention showing part of the drive train for driving the scarifier rotor, broom rotor and lift rotor.

In FIG. 5 there is shown a side view of turf aerator apparatus 10 showing part of the drive train for scarifier rotor 65, broom rotor 66 and lift rotor 67. There is provided right angle gear box 81 which is connected to clutch 30 which is coupled to gear box 81 having output shaft 82 to which is attached sprocket or gear pulley 83. Transmission belt 84 is engaged with gear pulley 83 as shown and belt 84 also engages with gear pulley 85 coupled to shaft 68. There is also provided tensioning pulley 86 for regulating tension of belt 84 as may be required.

Thus from the foregoing it will be appreciated that transmission belt 84 is responsible for driving shaft 68. There is also provided another transmission belt 87 shown in phantom located on the side 14A of turf aeration apparatus 10 which is connected to an end gear pulley 142 of shaft 68 shown in FIG. 8 and which is responsible for driving shaft 72. There is also provided timing belt 88 which is coupled to gear pulley 89 of shaft 78 and gear pulley 90 of shaft 72 so as to achieve simultaneous rotation of both shafts 72 and 78 as described previously. There is also provided tensioning pulley 91 for regulating tension of timing belt 88 as may be required. The transmission belt 87 is encased in drive casing 15 shown in FIGS. 1–2.

In FIG. 5 there is also shown bearings 92 for each of shafts 68, 72, 78 and 82 as well as bearing housings 93 for each of these shafts which each are attached to an adjacent side 14B of renovator 9 by fasteners 94.

Figure 6:
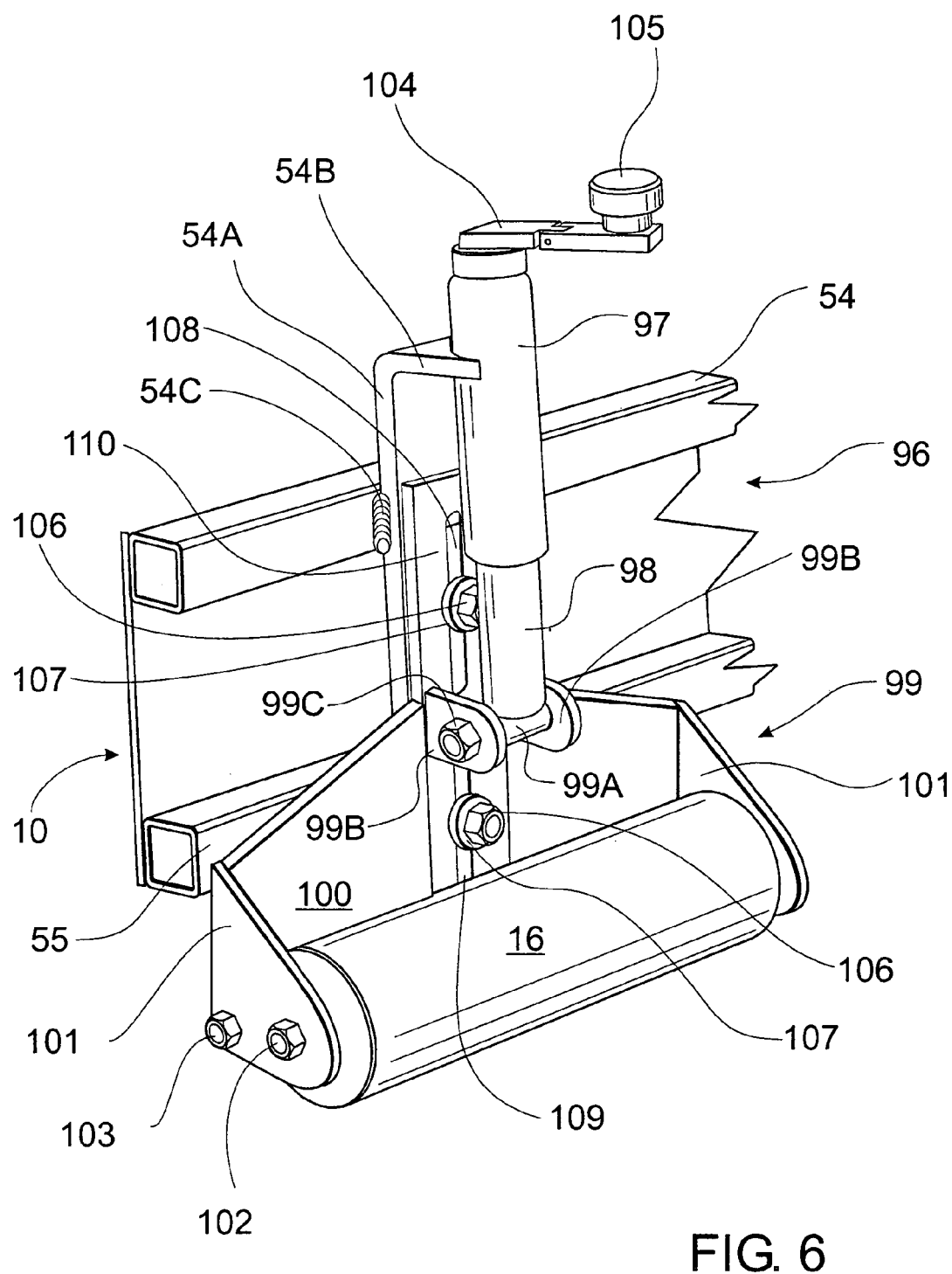
FIG. 6 is a perspective view showing a jacking mechanism for height adjustment of the front rollers of the turf aerator of the invention.

There is also provided a jacking mechanism 96 for height adjustment of rollers 16 shown in FIG. 6. Jacking mechanism 96 comprises a fixed outer cylinder 97 which is attached to an end projection 54B of rigid support plate 54A. Support plate 54A is welded to cross member or frame member 54 of turf aerator 10 at 54C. There is also provided a cylinder 98 which is telescopic with outer cylinder 97 and movable thereto. Attached to cylinder 98 is a support bracket assembly 99 for roller 16. Movable cylinder 98 has an end cross arm 99A attached to opposed projections 99B of support bracket assembly 99 by fasteners 99C. Support bracket assembly 99 also comprises a rear plate 100 and a pair of opposed end projections 101. Roller 16 is attached to each end projection 101 by fasteners 102. Fasteners 103 attach support bracket assembly 99 to a frame member (not shown) of frame 45.

Movement of cylinder 98 is achieved by rotation of handle 104 which has a knob 105. When it is desired to adjust the height of rollers 16 the handle 104 is rotated causing an internal jacking screw (now shown) to move support bracket assembly 99 in slots 108 and 109. When a desired height is obtained, releasing knob 105 allows the knob 105 to fall to a position wherein it is stopped from further movement by contact with end projection 54B. Both fasteners 106 and 107 are free to move in their mating slots 108 and 109 of upper strap 110 of support bracket assembly 99 and thus support bracket assembly 99 is able to move vertically. Thus all that is required to adjust the height of rollers 16 is actuation of handle 104 and knob 105 as described above.

Figure 7:
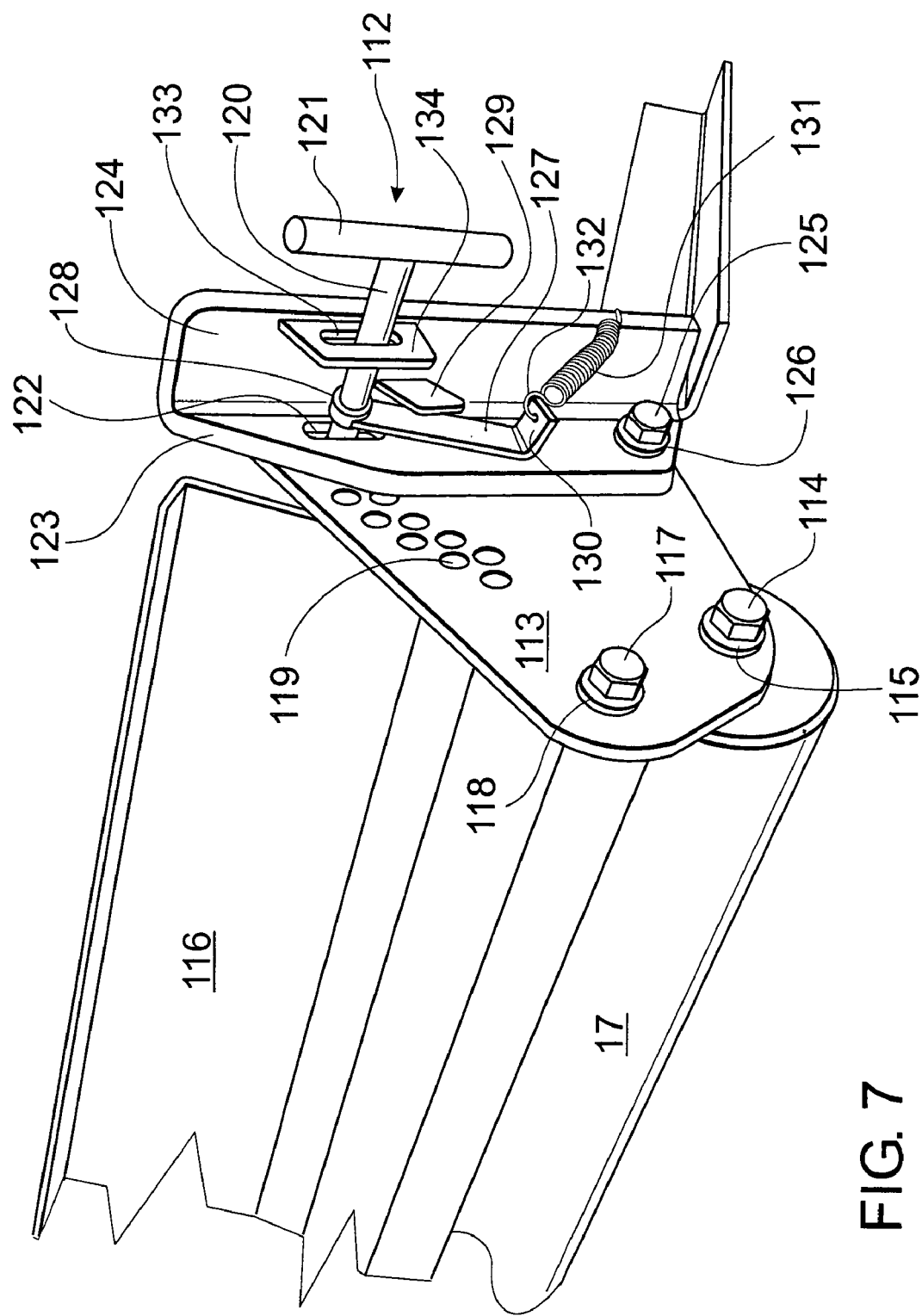
FIG. 7 is a perspective view of a height adjustment mechanism for the rear rollers of the turf aerator of the invention.

In FIG. 7 there is provided a rear height adjustment mechanism 112 for rollers 17. This comprises an adjustment plate 113 which is attached to roller 17 by fasteners 114 having washers 115. There is also provided support bracket 116 for roller 17 which is attached to adjustment plate 113 by fasteners 117 having washers 118. Adjustment plate 113 is also provided with adjustment apertures 119 for insertion of a locking pin 120 having handle 121. Locking pin 120 extends through slot 122 in flange 123 of mounting bracket 124 which is also attached to adjustment plate 113 by fasteners 125 having washers 126. There is also provided a catch 127 having attachment sleeve 128 to locking pin 120 which is retained in position by retainer 129. Catch 127 has a foot 130 to which is attached a spring 131 by hook 132. The provision of spring 131 ensures that locking pin 120 is always biased inwardly. Locking pin 120 also extends through slot 133 of lug 134 attached to mounting bracket 124.

It will be appreciated during height adjustment of rollers 17 that after release of fasteners 125 mounting plate 124 may be pivoted about the axis of fasteners 125 as may be required to allow insertion of locking pin 120 in a selected attachment aperture 119.

Figure 8:
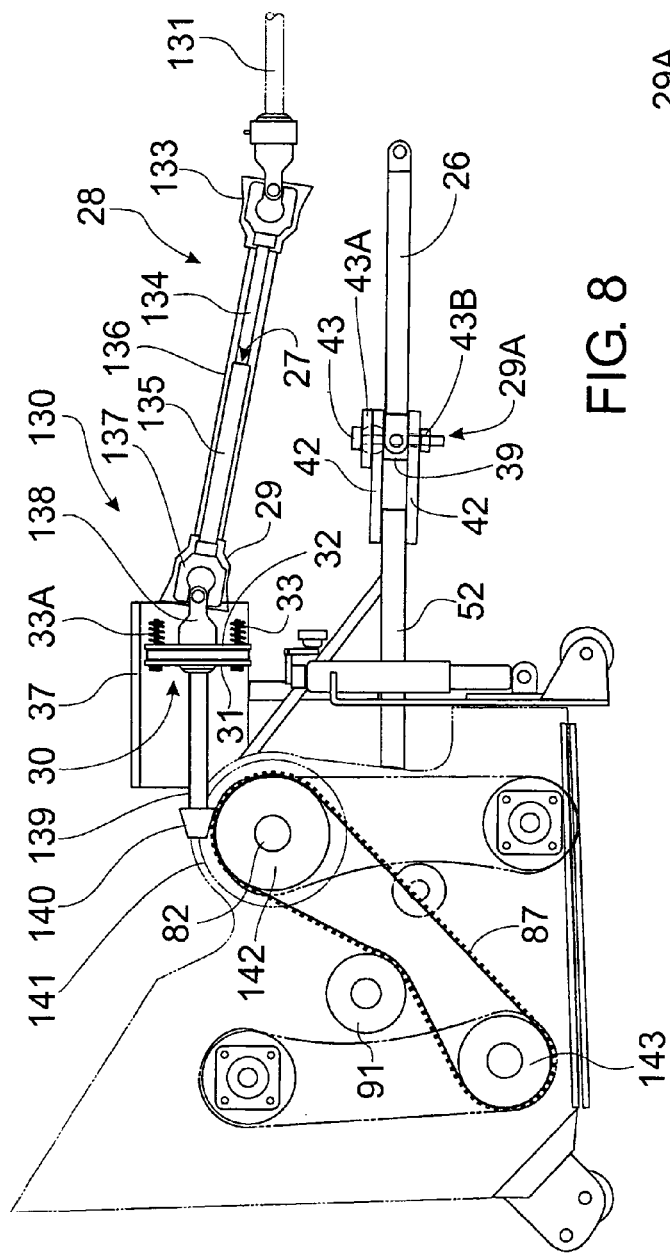
FIG. 8 is a side view of the drive train from the tractor in regard to driving the scarifying rotor of the turf aerator of the invention.

In FIG. 8 there is shown a drive train 130 for scarifying rotor 65. Drive train 130 includes output shaft 131 of tractor 9 coupled to power take off shaft 27 through a first universal joint 133. Drive shaft 27 has an inner component 134 telescopic with outer component 135. There is also provided outer safety sleeve 136 which may comprise components 27B and 27C shown in FIG. 3. There is also provided universal joint 137 which interconnects drive shaft 27 to a friction overload clutch 30 via coupling 138. There is also provided drive shaft 139 having a pinion gear 140 coupled to a crown gear 141 of shaft 82. This results in rotation of shaft 82 to thus drive scarifying rotor 65 as already described in FIG. 5. Transmission belt 87 has a pulley gear 142 as well as pulley gear 143.

Figure 10:
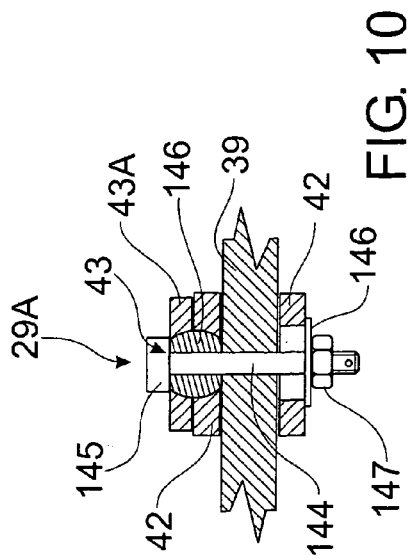
FIG. 10 is a transverse sectional view of the hitch assembly of the invention.
Figure 9:
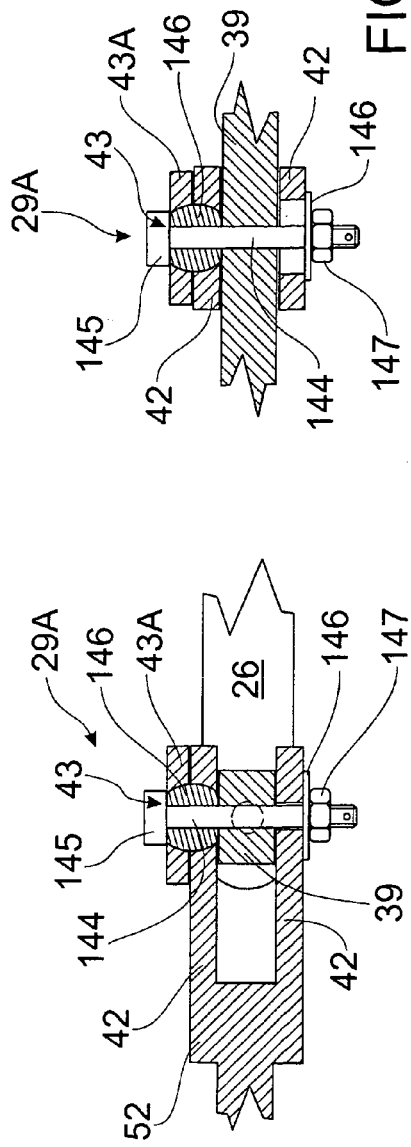
FIG. 9 is a longitudinal sectional view of the hitch assembly of the invention.

In FIGS. 8–10 further details of the lower hitch connection assembly 29A are shown wherein the fastener 43 having a shaft 144 and head 145 is provided with a bearing 146 which enables shaft 144 to function as a pivot arm to thus facilitate pivotal movement of arm 39 about an axis defined by shaft 144. There is also provided washer 146 and nut 147.

Figures 11, 12:
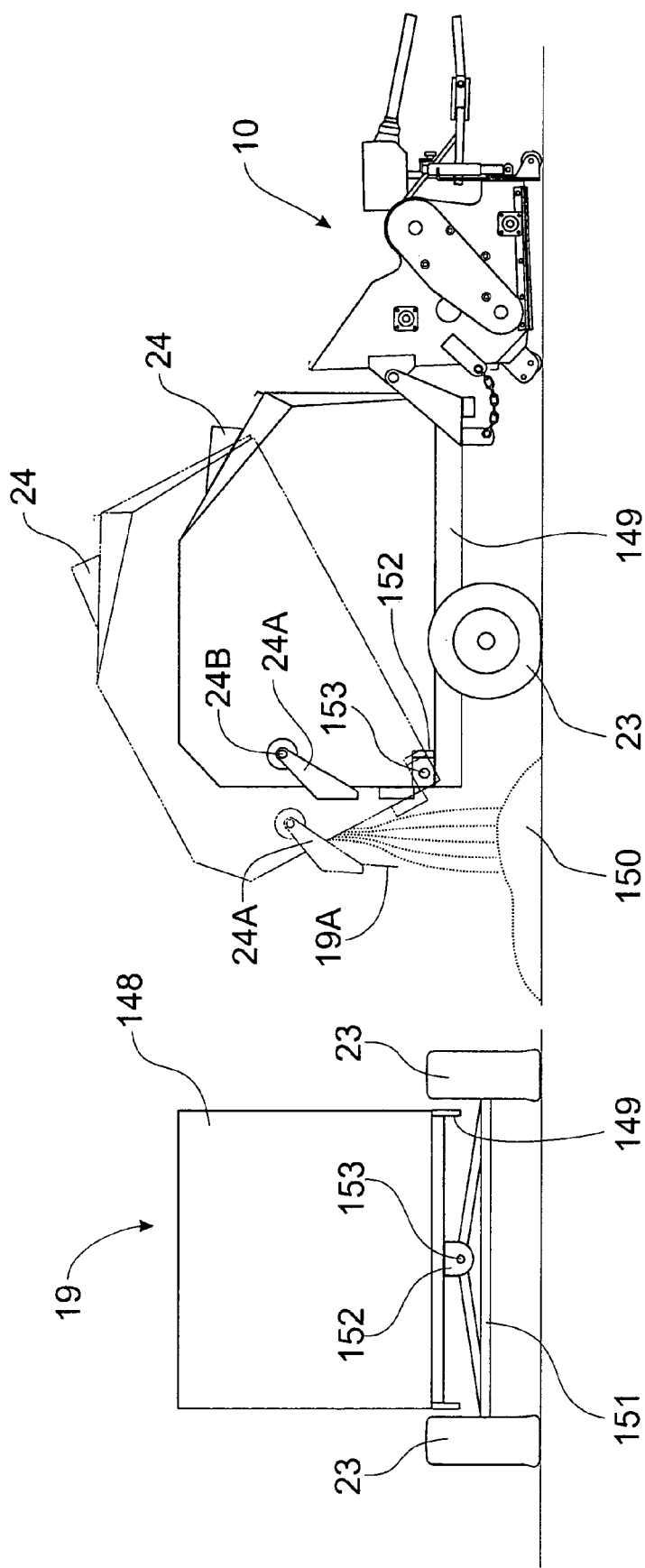
FIG. 11 is a schematic view showing operation of the hopper in regard to dumping scarified material onto the ground.
FIG. 12 is a schematic view showing the axle of the hopper being pivotally attached to an undercarriage of the hopper.

In FIG. 11 there is shown pivotal movement of an upper container part 148 of hopper 19 relative to an undercarriage 149 to thus pour scarified material 150 onto ground 25 or a trailer (not shown). Also in FIG. 12 axle 151 of hopper 19 is pivoted to undercarriage 149 at 153 to facilitate floating of scarifier rotor 65 relative to ground 25 whereby scarifier rotor 65 may follow ground contours or undulations.

Figure 13:
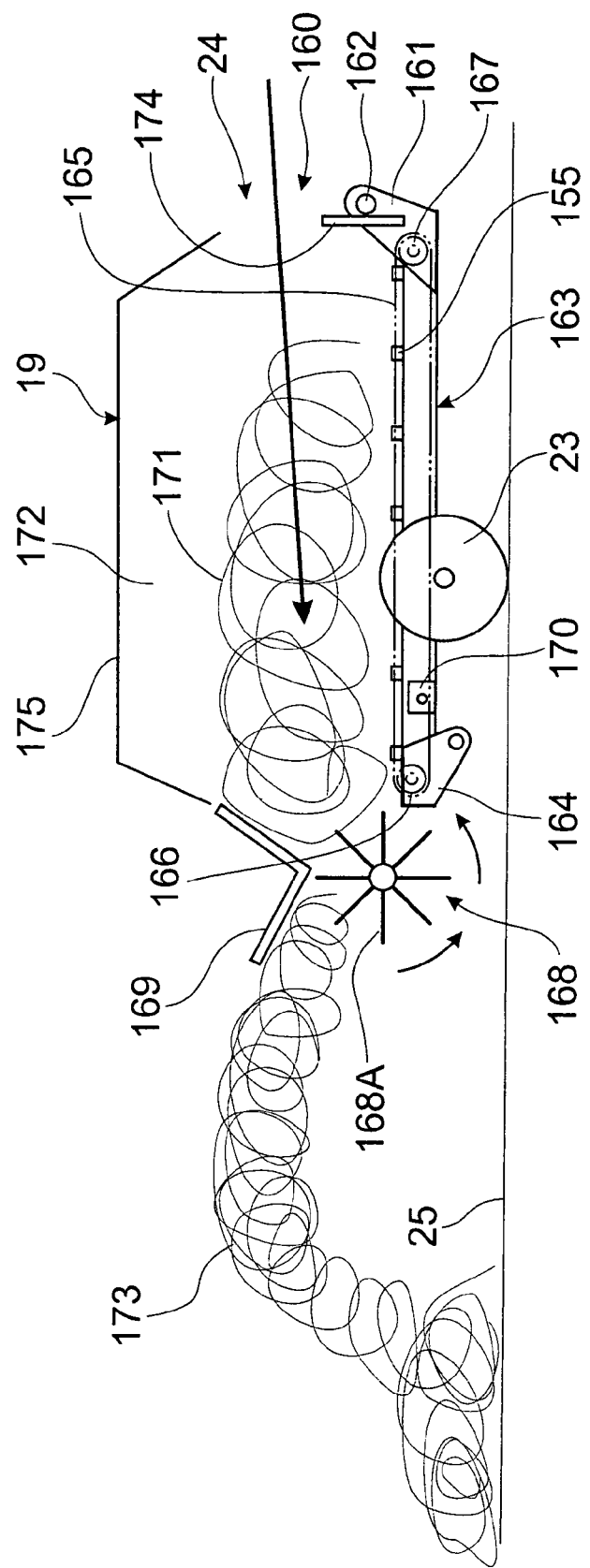
FIG. 13 is a schematic view showing operating of a sprigging apparatus of the invention which is attached to the hopper and used for harvesting of scarified material for replanting purposes.

In FIG. 13 there is shown sprigging apparatus 160 which is attached to turf aeration apparatus 10 by brackets 161 with fasteners (not shown) being inserted through attachment apertures 162. There is also provided an endless belt 163 having scraper bars 155 interconnected by chains 165. Belt 163 is driven by a hydraulic motor 164 which drive sprockets 166. There is also shown a sprigging rotor 168 having a plurality of spikes 168A which has rotatable axle 168 driven by another hydraulic motor (not shown) by an appropriate drive coupling (not shown). There is also shown deflector 169. Also provided is a speed control valve 170 for controlling the speed of belt 163. It will be noted that when scarified material 171 is pushed into the interior 172 of hopper 19, shown by the arrow in full outline, by the action of lift rotor 67, the action of belt 163 propels the scarified material 171 towards rotor 168, also shown by the arrow in full outline, wherein after passage through rotor 168 the sprigs 173 are fluffed up and spread evenly and thinly on ground 25 for harvesting purposes. There is also shown entrance 24 defined by front wall 174 of the hopper 19 and roof outline 175.

In another embodiment the sprigging rotor 168 may be dispensed with and thus belt 163 may be used to dispense scarified material 171 onto the ground at a dump site if required or refuse container (not shown).

In operation of the turf aeration apparatus of the invention the following sequence of events is followed:
(i) the ground maintenance machine 10 is set to the required depth by appropriate height adjustment of rollers 16 and 17;
(ii) the tractor hydraulic arms 26 are lowered below the hitch assembly 29A;
(iii) the arms 26 are then elevated and attached to transverse bar 39;
(iv) the turf aerator 10 is then elevated off the ground;
(v) the chains 8 are then adjusted until they are tight;
(vi) the turf aerator 10 is then lowered to the ground to commence operation.

The turf aerator 10 of the invention may be used for scarifying or providing slices in the ground 25 as well as dethatching the ground whereby dead grass is removed and grass is lifted upwardly by blades 69 extending below the grass. It is also possible to remove stolons or runners or trailing roots located above the ground so as to thin the grass and provide an even smooth surface. It is also possible to carrying out sweeping operations and use hopper 19 for stolon and core harvesting, as shown in FIG. 13, whereby the grass is replanted at another location.

It will also be appreciated that the turf aerator 10 of the invention can be used on completely waterlogged ground or in heavy rain as the presence of large amounts of surface groundwater does not affect the operation of the turf aerator 10.

It will also be appreciated that the method of operation of the ground maintenance machine 10 comprising steps (i) through (iv) above may constitute a fifth aspect of the invention.

Also there may be provided a sixth aspect of the invention which includes a method of ground maintenance as shown in FIG. 13 for example which includes the steps of:
(i) aerating the ground for the purpose of slicing, scarifying, dethatching, mowing or sweeping whereby ground debris including turf particles are conveyed upwardly in a closed aeration zone to exit the closed aeration zone above the ground;
(ii) conveying the ground debris into a storage zone; and
(iii) moving the ground debris through the storage zone; and
(iv) passing the ground debris comprising turf, roots, runners and stolons through a sprigging device for ultimate deposition on the ground whereby the ground debris is processed for replanting purposes.

What is claimed is:
1. A ground maintenance machine having:
(i) a pair of ground rotors, each having at least one operating member wherein said operating member contacts the ground when in use, the ground rotors being timed to operate simultaneously with their operating members rotating in unison and having a similar orientation with only a relatively small distance between each ground rotor, wherein the pair of ground rotors comprise a front ground rotor and a rear ground rotor relative to a direction of travel of the ground maintenance machine;

(ii) a deflector located intermediate each of the ground rotors and occupying said relatively small distance;

(iii) a lift rotor located above said pair of ground rotors in unison with the operating members of the rear ground rotor and having a similar orientation with only a relatively small distance between the lift rotor and the rear ground rotor with the front ground rotor spaced from the lift rotor by a larger distance;

(iv) a front deflector located in advance of the front ground rotor and the lift rotor; and (v) a rear deflector located rearwardly of the rear ground rotor and the lift rotor whereby each of the pair of ground rotors and lift rotor are located in a housing having a rear exit for transport of debris or loose ground material generated by the pair of ground rotors in use.

2. A ground maintenance machine as claimed in claim 1 wherein the front ground rotor is a scarifier rotor having operating members in the form of scarifying blades that penetrate the ground.

3. A ground maintenance machine as claimed in claim 2 wherein the rear ground rotor is a broom rotor having a plurality of brooms configured to contact the ground.

4. The ground maintenance machine as claimed in claim 1 wherein the operating members of the ground rotors comprise one or more reels, paddles, brooms, blades, scrapers, cutters or slicers attached to a rotatable rotor axle.

5. The ground maintenance machine as claimed in claim 1, wherein there is provided a timing or transmission belt interconnecting gears, pulleys or sprockets of rotatable axles comprising part of the scarifier rotor and the broom rotor.

6. The ground maintenance machine as claimed in claim 1, wherein there is provided a jacking mechanism for height adjustment of a front pair of rollers attachable to the ground maintenance machine.

7. The ground maintenance machine as claimed in claim 1, wherein there is provided a height adjustment mechanism for height adjustment of a rear pair of rollers of the ground maintenance machine.

8. A ground maintenance machine as claimed in claim 1 wherein the housing is support by at least one ground engaging roller non-pivotable attached to a front of the housing.

9. A ground maintenance machine as claimed in claim 1 wherein the housing is supported by at least one ground engaging roller non-pivotable attached to a rear of the housing.

10. A combination of a prime mover having hitched thereto and the ground maintenance machine of claim 1 and a trailer attached to the ground maintenance machine.

* * * * *